(No Model.) 3 Sheets—Sheet 1.

JOHN, PAUL, AMOS, FREDERICK & ARTHUR CAVE.
LASTING MACHINE.

No. 412,467. Patented Oct. 8, 1889.

Witnesses:

Inventors:
John Cave; Paul Cave;
Amos Cave; Frederick Cave
Arthur Cave
By their atty.
Whitaker & Prevost (No Model.) 3 Sheets—Sheet 2.

JOHN, PAUL, AMOS, FREDERICK & ARTHUR CAVE.
LASTING MACHINE.

No. 412,467. Patented Oct. 8, 1889.

Witnesses:

Inventors:
John Cave; Paul Cave;
Amos Cave, Frederick Cave
Arthur Cave
By their attys
Whitaker & Prevost (No Model.) 3 Sheets—Sheet 3.
JOHN, PAUL, AMOS, FREDERICK & ARTHUR CAVE.
LASTING MACHINE.
No. 412,467. Patented Oct. 8, 1889.
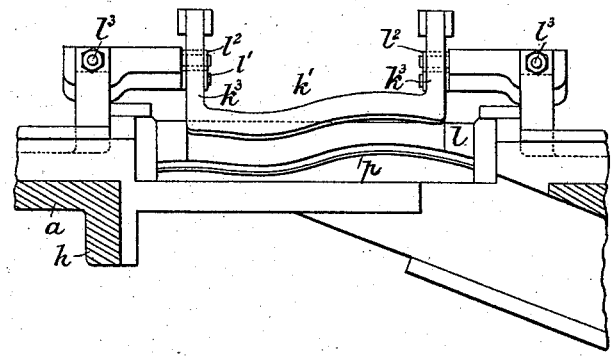
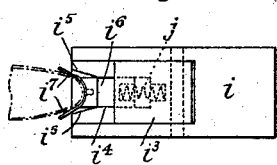
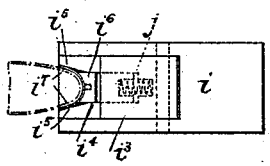
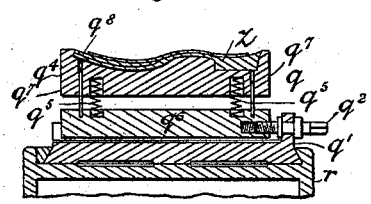
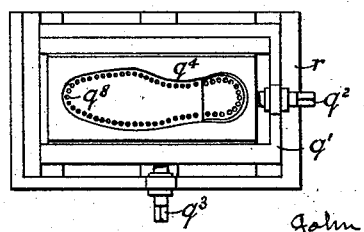

UNITED STATES PATENT OFFICE.

JOHN CAVE, PAUL CAVE, AMOS CAVE, FREDERICK CAVE, AND ARTHUR CAVE, OF RUSHDEN, COUNTY OF NORTHAMPTON, ENGLAND.

LASTING-MACHINE.

SPECIFICATION forming part of Letters Patent No. 412,467, dated October 8, 1889.

Application filed June 22, 1888. Serial No. 277,885. (No model.)

*To all whom it may concern:*

Be it known that we, JOHN CAVE, PAUL CAVE, AMOS CAVE, FREDERICK CAVE, and ARTHUR CAVE, subjects of the Queen of Great Britain, residing at Rushden, in the county of Northampton, England, have invented new and useful Improvements in the Manufacture of Boots and Shoes and in Machinery Therefor, of which the following is a specification.

Our invention chiefly relates to machinery by which boot or shoe uppers can be lasted and the sole applied ready for being sewed, riveted, screwed, or otherwise attached to the uppers; and it comprises the improvements hereinafter described.

Figure 1:
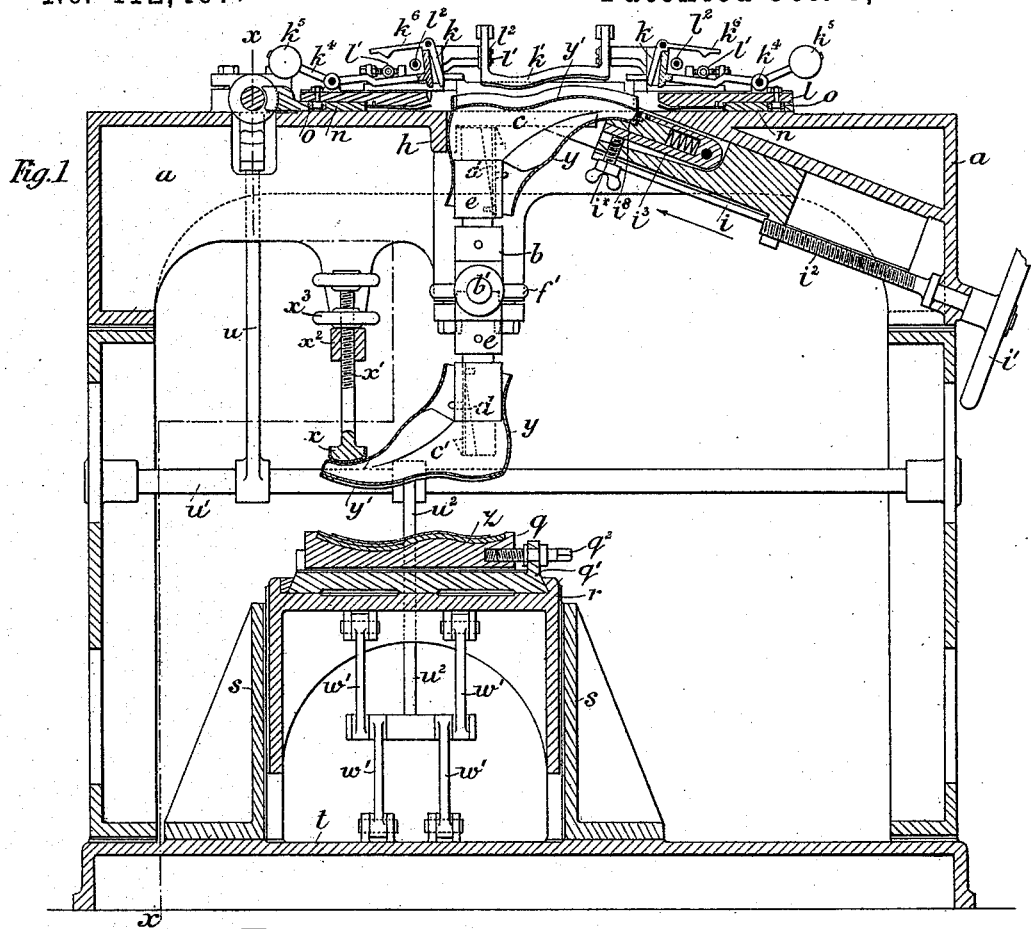
Figure 2:
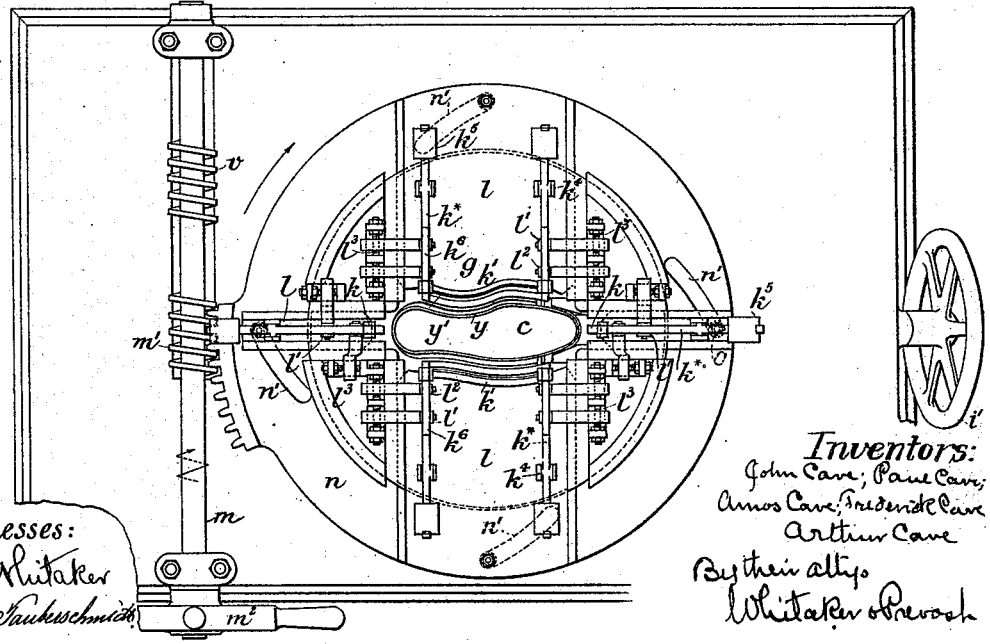
Figure 3:
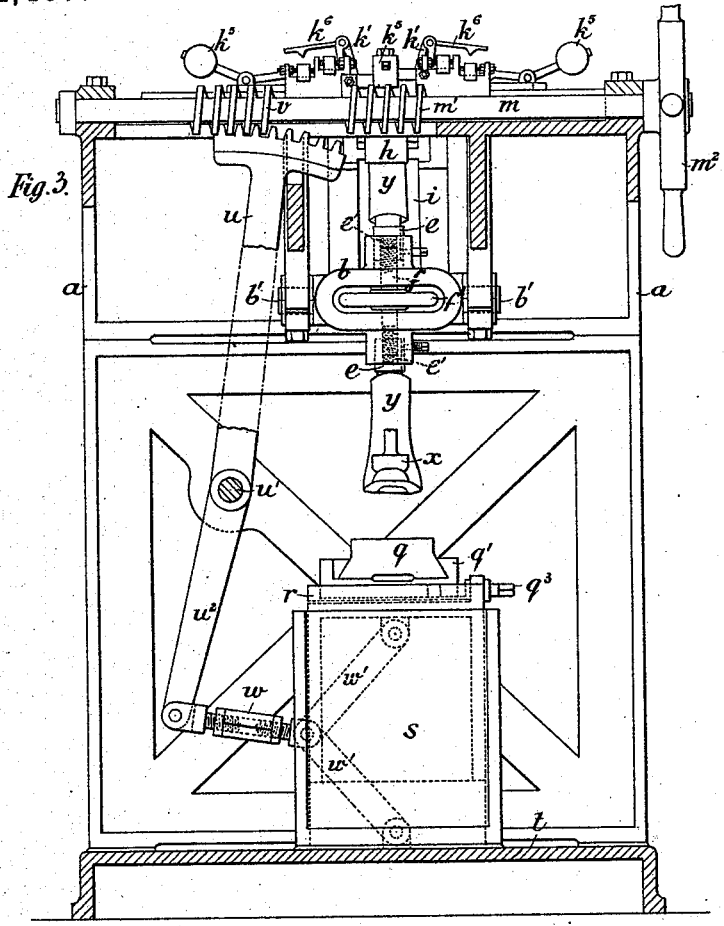
Figure 4:
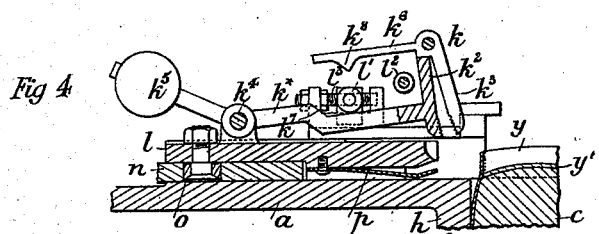
Figure 5:
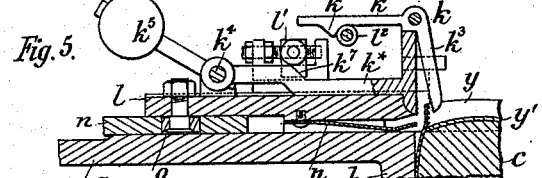
Figure 6:
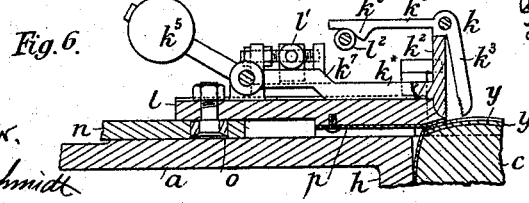

In the accompanying drawings, Figures 1 and 2 are a longitudinal section and plan, respectively, of a machine constructed according to our invention. Fig. 3 is a section on the line $x\,x$, Fig. 1. Figs. 4, 5, and 6 are longitudinal sections, drawn to an enlarged scale, of the mechanism for lasting the heel portion of the upper of a boot or shoe, the said mechanism being represented in three of the positions which it occupies while performing the said operation. Fig. 7 is a longitudinal section, also drawn to an enlarged scale, of the mechanism for lasting one of the sides of the upper of a boot or shoe. Figs. 8 and 9 are plans of the mechanism for holding the toe portion of the upper of a boot or shoe while being lasted. Figs. 10 and 11 are a longitudinal section and plan, respectively, of the mechanism for riveting a sole to a boot or shoe upper after being lasted.

Similar reference-letters indicate similar or corresponding parts throughout the drawings.

$a$ is the frame of the machine, and $b$ is a duplex last-holder, which is mounted on trunnions $b'$, supported in bearings in the frame $a$.

$c\,c'$ are two lasts, which are mounted upon the opposite ends of the holder $b$ and secured thereto by means of spring-catches $d\,d$. Each last is adapted to carry an upper, so that while one upper is being lasted the sole can be applied to the upper previously lasted. The central portion of the holder consists of a yoke B, having extensions $b^3\,b^3$, to which the last-engaging ends $e\,e$ are connected. The pivots of the holder are connected with the yoke.

The ends $e\,e$ of the holder $b$, which directly carry the lasts, are provided with sockets having internal screws $e'\,e'$, as shown in Fig. 3, engaging with right and left hand screw-threads on a spindle $f$, operated by a hand-wheel $f'$, located within the yoke B, for the purpose of adjusting the position of the lasts, as hereinafter described.

$g$ is an opening in the top of the frame, through which the last which is uppermost projects more or less.

$h$ is a heel-support for holding the upper-last firmly while an upper is being lasted thereon, and $i$ is a sliding toe-support operated by a hand-wheel $i'$ and screw $i^2$ in an inclined direction. The support $i$ has pivoted therein a block $i^3$, capable of adjustment by means of a screw $i^*$, and provided, as shown in Figs. 8 and 9, with a recess or channel $i^4$, having inclined surfaces $i^5$. Within the recess or channel $i^4$ is arranged another block $i^6$, provided with spring-jaws $i^7$ in a recess $i^8$, for receiving the toe of the last and the upper thereon.

$j$ is a spring, which normally causes the blocks $i^6$ to project so that when the slide or toe-support $i$ is operated by the hand-wheel $i'$ in the direction of the arrow, Fig. 1, the said block $i^6$, when it meets the toe of the last, as shown in Fig. 8, is caused to remain stationary, while the slide $i$ and block $i^3$, continuing to move forward, cause the inclined surfaces $i^5$ to force the jaws $i^7$ inwardly, so as to press the upper tightly upon the toe of the last. In addition to holding the last and upper firmly while being lasted, the toe-holding mechanism causes the toe of the upper to conform to exactly the shape of the toe of the last, thereby saving the extra hand-labor which is required to do the same thing when using other lasting-machines.

$k\,k\,k'\,k'$ are the pinchers, which are made of shapes corresponding to the last, as shown in Fig. 2, and which we provide for pulling and stretching the upper tightly over the last in the operation of lasting, the pinchers $k\,k$ being used at the toe and heel and the pinchers $k'\,k'$ at the sides.

Each pair of pinchers comprises a pair of jaws $k^2\,k^3$, hinged together, each jaw $k^2$ being provided with an extension $k^*$, pivoted at $k^4$ to a slide $l$ and with a counter-weight $k^5$. The extension is also provided with a cam or inclined portion $k^7$. Each of the jaws $k^3$ is also provided with an extension $k^6$, having a cam or double-inclined portion $k^8$. The two cams $k^7$ and $k^8$ are caused to move against adjustable rollers $l'$ $l^2$, respectively, and to thereby operate the pinchers when the slide $l$ is moved, as hereinafter described.

$l^3$ $l^3$ are screws for adjusting the rollers $l'$ and $l^2$.

$m$ is a shaft having the worm $m'$, and $n$ is a ring having teeth on its periphery, which engage with the said worm.

$n'$ $n'$ are cam-slots, which are formed in the ring $n$ and engage with rollers $o$ on the under sides of the slides $l$, so that when the said shaft is turned by the hand-wheel $m^2$ in the direction of the arrow, Fig. 2, the ring will be caused to turn and move all the slides $l$ simultaneously toward the last and upper.

$p$ $p$ are clamps for pressing down the edges of the upper onto the insole, as hereinafter described, the said clamps being attached to the under sides of the slides $l$, and formed as flat or approximately flat springs.

$q$ is a presser adapted to apply a sole to an upper on the lower last. This presser slides, and is capable of adjustment longitudinally in a block $q'$ by means of a screw $q^2$, the said block $q'$ sliding and being capable of adjustment transversely by means of a screw $q^3$ in a bracket $r$. The bracket $r$ slides vertically between brackets $s$ $s$, attached to the base-plate $t$ of the machine, and is operated by means of a lever $u$, mounted upon a shaft $u'$, and having worm-teeth which engage with a worm $v$ on the shaft $m$, and a lever $u^2$, also mounted upon the shaft $u'$, and engaging by means of an adjustable link or connecting-rod $w$ with toggle-levers $w'$, connected to the said bracket and to the base-plate $t$.

$x$ is a stop capable of adjustment by means of a screw $x'$ in a bracket $x^2$, depending from the frame of the machine, the said stop serving to support the pressure upon the top of the lower last, while the sole is being pressed onto the upper thereon.

$x^3$ is a lock-nut to fix the screw $x'$ after having been adjusted. The stop $x$ we denominate the "toe-support" for the lower last.

In applying the uppers and soles the edges or portions of the same which come into contact are coated with glue, cement, or other adhesive material, so that they will adhere, thus rendering the use of tingles or tacks unnecessary.

The operation of our machine is as follows—that is to say: Assume the slides $l$ to be in the position shown in Figs. 1 and 2 and the support $i$ slightly drawn back. We place upon, say, the last $c$ a boot or shoe upper $y$ and an insole $y'$ in the usual manner, and then pass the last with the boot thereon down through the opening $g$ in the top of the machine and cause it to engage with one end of the holder $b$ by means of its spring-catch $d$. The hand-wheel $i'$ is then operated to cause the support $i$ to move in the direction of the arrow, Fig. 1, so as to firmly hold the last and upper against the heel-support $h$, as hereinbefore described. The upwardly-projecting edges of the upper having been prepared with suitable cement, the shaft $m$ is rotated in the direction of the arrow, Fig. 2, so as to cause the pinchers to grip the said projecting edges of the upper and pull and thereby stretch the said upper tightly on the last. This operation will be more clearly understood by reference to Figs. 4, 5, and 6, which represent the mechanism for lasting the heel of the upper, as hereinbefore described, the mechanisms for lasting the other parts of the upper being of similar construction and operating in the same manner. Fig. 4 represents the normal or open position of the slide $l$. If the said slide be now advanced by means of its cam-slot $n$ into the position shown in Fig. 5, it will be seen that the cam or inclined portion $k^*$ will come against and pass under the roller $l'$, and thereby depress the pinchers into the position shown, the jaws of the pinchers being on either side of the projecting edge $b'$ of the upper, and at the same time the extension $k^6$ will have moved down onto the roller $l^2$. By continuing the movement of the slide $l$ the cam $k^3$ on the extension $k^6$ of the pinchers will ride over the roller $l^2$ and cause the pinchers to grip the upper, which by the continued movement of the slide will be stretched tightly over the last. The pinchers will then be caused to release their grip by the cam $k^8$ passing over the roller $l^2$, and the continued movement of the slide $l$ will cause the clamp $p$ to press down the edge of the upper onto the insole, as represented in Fig. 6. The edges of the upper being now all pressed down, the clamps are kept in their position until the cement is sufficiently hard. When this is effected, the slides $l$ are all moved back into their normal or open positions, and the toe-holding mechanism also drawn back by the screw $i^2$. The last-holder is now turned upon its trunnions so that the last $c$, with the upper thereon, rests against the stop $x$. The last $c'$, with an upper and insole thereon, is now inserted through the opening $g$ in the top of the machine. In the meantime a sole $z$, having the middle sole pressed on and provided with the shank and bottom filling, is placed in the recess in the presser-block $q$, the said sole being cemented on its upper edge round the said shank and bottom filling. If now the hand-wheel $m^2$ be turned as before, the upper which is under the pinchers will be lasted, and the already lasted upper, which, if required, can also have its turned-down edges covered with cement, will have the sole $z$ pressed onto it by the presser $q$ under the action of the levers $u$ $u^2$, the link $w$, and toggle-levers $w'$, as will be well understood. Instead of the shank and bottom filling being fixed to the sole $z$, they may be fixed to the lasted upper before having the sole pressed on. After the sole has been pressed on the boot or shoe can be removed by depressing its spring-catch $d$.

If required, the sole can be further secured by sewing, riveting, or the like.

Sometimes we rivet the sole, and with it the heel, directly to the lasted upper. For this purpose we provide the mechanism shown in Figs. 10 and 11, which, as will be seen, is somewhat similar to the mechanism for pressing the cemented sole on, as shown in Fig. 1, and is fixed in the same position on the bed-plate of the machine. The block $q$ is, however made in two parts, the upper part $q^4$ resting on springs $q^5$, attached to the lower part $q^6$. The part $q^6$ is provided with plungers $q^7$, which work through holes $q^8$ in the part $q^4$. If now rivets be placed in the holes $q^8$ above the plungers $q^7$ and a sole, with heel attached, be placed in the recess in the part $q^4$ of the block $q$, by moving the block with the sole thereon upward in a similar manner to that hereinbefore described, the said sole and the part $q^4$ of the block $q$ will be first caused to bear against the lasted upper. During the continued upward movement of the part $q^6$ the springs $q^5$ will be compressed, and the plungers $q^7$ will move upward through the holes $q^8$ and force the rivets into the sole and lasted upper, thereby completing the boot.

By employing more holes and plungers we can, if required, drive studs or nails into the sole of the boot at the same time that we rivet the sole on.

Having now particularly described and ascertained the nature of our said invention and in what manner the same is to be performed, we declare that what we claim is—

1. In a shoe-lasting machine, the combination, with a last-holder pivoted intermediate its ends and adapted to receive a last at each end, of lasting devices and sole-pressing devices in planes separated by a space substantially equal to the length of the last-holder, whereby when the said last-holder is turned to its operative position the lasting devices may operate in connection with one last and the sole-pressing devices in connection with the other, substantially as described.

2. The combination, with a last-holder pivoted intermediate its ends and adapted to receive a last at each end, of stationary separated lasting devices and sole-pressing devices and two stationary toe-supports, substantially as described.

3. In a shoe-lasting machine, a last-holder pivoted intermediate its ends and separated lasting devices and sole-pressing devices, the said sole-pressing devices moving and exerting pressure longitudinally of the last-holder, whereby the pressure of the lasting devices tends to neutralize the pressure of the sole-pressing devices on the trunnion of the last-holder, substantially as described.

4. In a shoe-lasting machine, a last-holder pivoted intermediate its ends and adapted to receive a last at each end, the last-receiving portion of each end being adjustable to and from its pivot, in combination with lasting devices and sole-pressing devices in planes separated by a space substantially equal to the length of the last-holder, substantially as described.

5. In a shoe-lasting machine, a last-holder composed of three parts, the central part being pivoted and a right and left hand screw extending longitudinally thereof and engaging the end parts, whereby the end parts of the last-holder may be simultaneously adjusted, substantially as described.

6. In a shoe-lasting machine, a last-holder composed of three parts, the central part having the yoke B, the right and left hand screw, and the hand-wheel $f$ on said screw located within said yoke, and the ends $e$ $e$, engaging the outer ends of the screw, substantially as described.

7. The combination, with a last-holder pivoted intermediate its ends and adapted to receive a last at each end, of separated lasting devices and sole-pressing devices, a driving-shaft, intermediate gearing connecting said shaft and said lasting and sole-pressing devices, substantially as described.

8. The combination, with a last-holder pivoted intermediate its ends and adapted to receive a last at each end, of separated lasting devices and sole-pressing devices, a driving-shaft provided with a worm, a cam-ring for operating the lasting devices, having a segment engaging the worm on the driving-shaft, a lever provided with a gear-segment engaging a worm on said driving-shaft, and a toggle connecting said lever and said sole-pressing device, substantially as described.

9. In a lasting-machine, the combination, with a last-holder, of lasting devices comprising upper-holding pinchers, one pair on each side of the shoe, having jaws conforming to the shape of the shoe and adapted to grasp the upper throughout the main portion of its length, and straight heel and toe pinchers intermediate said side pinchers, substantially as described.

10. In a lasting-machine, the combination, with a last-holder, of slides mounted radially with respect to the center of the sole of the last, pinchers pivoted on said slides adapted to be held in an elevated position, and cams and tappets for depressing said pinchers, one of said devices being mounted on the slides and the other mounted rigidly on a stationary part of the machine, whereby a movement of the slides effects the downward movement of the pinchers, substantially as described.

11. In a shoe-lasting machine, the combination, with a last-holder, of a slide arranged radially with relation to the center of the sole of the last, a pair of pinchers pivotally mounted on said slide and adapted to be held in an elevated position, a cam for lowering said pinchers, and a cam for closing the movable jaw of said pinchers, substantially as described.

12. In a shoe-lasting machine, the combination, with a last-holder, of a slide mounted radially with respect to the center of the sole of the last, pinchers for grasping the upper on the last pivotally mounted on said slide, a clamp for engaging and pressing down the edge of the upper, and a cam for closing and releasing the movable jaw of said pinchers, substantially as described.

13. In a shoe-lasting machine, the combination, with a last-holder, of slides mounted radially with respect to the center of the last, pinchers mounted on said slides, cams for depressing the pinchers, cams for operating the movable jaws of the pinchers, a cam-ring engaging and operating all of said slides, and a driving-shaft operating said ring, whereby a movement of the driving-shaft effects the moving of the slides and the gripping and releasing of the upper, substantially as described.

14. In a shoe-lasting machine, a toe-support separated from the lasting devices and consisting of a movable body provided with a pivoted portion for engaging the toe, a set-screw for adjusting the pivoted toe-supporting portion, and a screw for adjusting said movable body, substantially as described.

15. In a shoe-lasting machine, a toe-support separated from the lasting devices and provided with a pivoted portion for engaging the toe, said pivoted portion having mounted therein a sliding spring-pressed block provided with spring-jaws for directly engaging the toe of the shoe, a screw for adjusting the pivoted portion, and a screw for adjusting the support, substantially as described.

16. In a shoe-lasting machine, the combination, with a toe-support mounted in inclined guides, of a screw for moving and retaining the same, said toe-support having a pivoted portion provided with inclined portion $i^5$, and a sliding spring-pressed block provided with spring-jaws for directly engaging the toe of the shoe, and a screw for adjusting the pivoted portion, substantially as described.

JOHN CAVE.
PAUL CAVE.
AMOS CAVE.
FREDERICK CAVE.
ARTHUR CAVE.

Witnesses:
W. H. SMITH,
*Notary Public, Northampton.*
F. C. WOODWARD,
*Clerk to Meyer, Cave & Son, Rushden.*